A. F. ROCKWELL.
MACHINE TOOL.
APPLICATION FILED OCT. 31, 1912.
1,142,730.
Patented June 8, 1915.
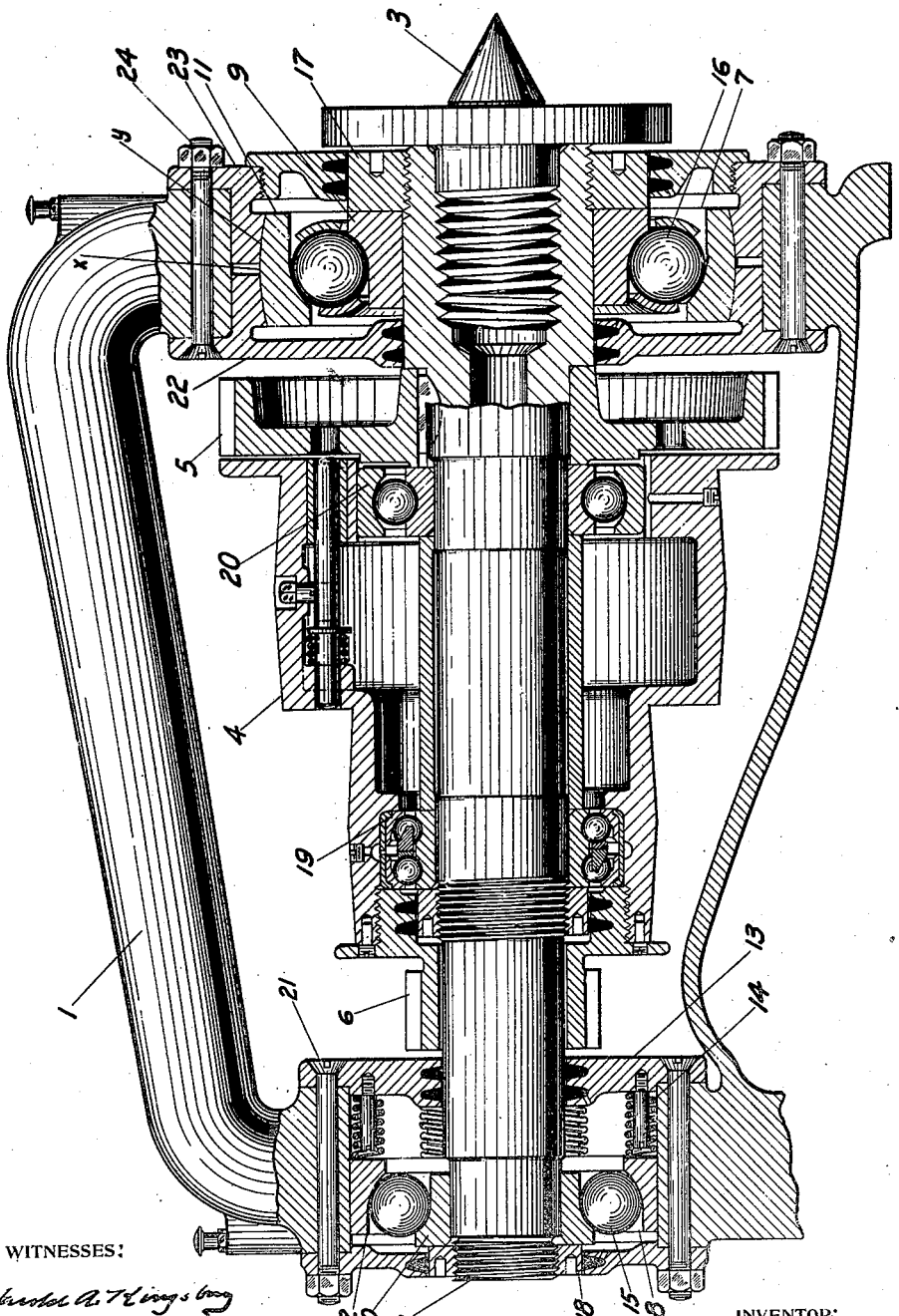
WITNESSES:
INVENTOR:
ALBERT F. ROCKWELL,
BY
his ATTORNEY.

UNITED STATES PATENT OFFICE.

ALBERT F. ROCKWELL, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

MACHINE-TOOL.

1,142,730.   Specification of Letters Patent.   Patented June 8, 1915.

Application filed October 31, 1912. Serial No. 728,793.

*To all whom it may concern:*

Be it known that I, ALBERT F. ROCKWELL, a citizen of the United States, residing at Bristol, county of Hartford, State of Connecticut, have invented a certain new and useful Machine-Tool, of which the following is a full, clear, and exact description, such as will enable others skilled in the art to which it appertains to make and use the same, reference being had to the accompanying drawings, forming part of this specification.

My invention relates to machine tools and more particularly to lathes, milling machines and the like having a rotatable shaft or spindle which is subjected to a lateral or radial load during the operation of the machine.

In lathes and the like as heretofore constructed, a difficulty has been that the spindle, when subjected to a laterally or radially applied load such, for example, as that of the cutting tool, would be forced out of line or center, resulting in untrue cutting of the work. This difficulty has been apparent in plain bearings since the spindle would shift to one side due to the necessary clearance provided for lubrication. It has also been apparent in attempts to support the spindle in antifriction bearings as a race member connected to the spindle could shift radially toward its coöperating race member permitting the spindle to shift out of center. This action would occur when a load, such as that of the cutting tool and having a radial component, was applied to the spindle. It was due to the fact that all of the antifriction members were not at all times, including the time of application of the load, held under pressure between the race members and the race members at all times forced into contact with all the antifriction members to thereby preclude any chance for play which would result in the lateral or radial shifting of the spindle.

One object of my invention is to provide a lathe or the like whose spindle is mounted in antifriction bearings the race members of which at all times press against all the antifriction members and hold all of such antifriction members at all times under pressure upon their races.

Another object is to provide means for constantly holding a lathe spindle so that it will run absolutely true even under a heavy laterally or radially applied load, such as that of the cutting tool.

Another object is to provide a lathe or the like in which the spindle is securely held against the slightest tendency toward lateral or radial movement.

Another object is to provide an antifriction bearing for the spindle in which all of the balls have equal bearing.

To these ends and also to improve generally upon devices of the character indicated, my invention consists in the various matters hereinafter described and claimed.

In the accompanying drawing, the figure represents a substantially diametrical section of a lathe head having my invention embodied therein.

While not restricting my invention thereto, I show and describe a lathe embodying my invention. In the embodiment of my invention here illustrated there is shown the usual lathe head frame 1 carrying, rotatably supported therein, the spindle 2, with its center 3. The spindle is driven by the usual step pulley 4 either directly through the gear 5 or through the gear 6 and back gears (not shown).

The spindle 2 is supported in the lathe frame by antifriction bearings 7 and 8 having, each, bearing surfaces extending in a generally oblique line, giving angular contact for the antifriction members, and capable of taking both radial and thrust loads, and whose inner race members 9 and 10, respectively, are securely fixed upon the spindle against longitudinal sliding.

The outer race member 11 of the bearing 7 is fixed against longitudinal sliding while the outer member 12 of the bearing 8 is slidably mounted. Between a fixed abutment 13 and the slidable race member 12 are placed springs 14 under compression. These springs force the race member 12 against all the balls 15, and the race member, cone 9, against all the balls 16 and the balls 16 against the race member 11 with such a pressure as to always hold the balls 15 and 16 under pressure upon their raceways. And such pressure is sufficiently great to insure that, even under a heavy laterally or radially applied load (such as that of the tool), such pressure is not overcome and even those balls of that portion of the bearing which does not directly support such load will yet be held under pressure (from the springs) between the raceways, whereby such balls and the races are held in close intimate contact under pressure at all times. Thus there can be no yielding of an inner race member laterally or radially toward its coöperating outer race member. Thus the spindle remains true on its support under a laterally or radially applied load, that is, one having a radial component tending to force the spindle sidewise or out of center on the support, such as that of the cutting tool. Furthermore, since the springs maintain the raceways and antifriction members in constant intimate contact at all times, even should the parts become worn such wear will be at once taken up and the spindle will yet run true and be unyielding toward any tendency toward lateral or radial movement. Thus, in the illustrated embodiment there are provided a plurality of bearings have bearing surfaces extending each in a generally oblique line and capable of taking a radial and a thrust load and here shown as the antifriction bearings 7 and 8, and thrust means for so powerfully forcing one of the bearing members, as race member 12, of one of the bearings, as 8, toward its coöperating bearing member, as race member 10, and the bearing member, as 9, of another bearing, as 7, toward its coöperating bearing member, as 11, as to preclude any possible lateral or radial shifting of the spindle in its support and to take up any wear between the bearing surfaces.

The thrust means, pressure device, compensator, or pressure abutment for forcing one of the bearing members may conveniently be the springs 14 above referred to. I find springs highly satisfactory as they are comparatively inexpensive and easily installed.

To insure the accuracy and agreement of the two inner raceways, I prefer to assemble them upon the spindle and grind them on the same center. To insure the proper working relation between the inner race member, as 9, and the outer race member, as 11, I prefer to laterally curve the rim of the outer race member upon a spherical surface whose center is at the intersection of the longitudinal axis of the spindle and the line connecting the centers of opposite balls and perpendicular to said axis, as indicated at $x$, and to form the support of such outer race member with a coöperating like curved seat as indicated at $y$. Evidently, with this arrangement the outer race member 11 will true with the inner 9 when the parts are assembled, resulting in equal bearing for the balls. Moreover, the force of the springs maintains the parts in proper position.

Conveniently, and as here shown, the fixed abutment 13 for the springs 14 may be a part of the lathe frame. The sliding of the race members 9 and 10 may be conveniently prevented by the circular nuts 17 and 18 screwed upon the spindle, while obviously the surfaces $x$ and $y$ above referred to prevent longitudinal sliding of the race member 11. In the illustrated device the stepped pulley 4 is rotatably supported upon the spindle 2 by means of the antifriction bearings 19 and 20. For convenience in assembling, the abutment 13 may be in the character of a circular plate held to the frame casting by the bolts 21. Also the support for the outer race member 11 may be composed of matching sections 22 and 23 held upon the frame casting and fixed with relation to each other by the bolts 24. The pulley may be diametrically split in the well known manner to facilitate its mounting upon and removal from the spindle.

It will be seen that I have provided a lathe in which the spindle is antifrictionally mounted and is always securely held against any tendency toward shifting out of true under the load of the tool and in which all wear is taken up so that the parts cannot work loose, and in which all of the antifriction members have equal bearing.

Having thus described my invention, what I claim as new and desire to secure by Letters Patent is:

1. In a lathe and the like having an antifriction mounting for its spindle, the combination with a spindle adapted to receive a radial load and antifriction means for supporting said spindle; such antifriction means comprising race members each provided with a raceway and antifriction members between said race members and traveling upon said raceways; of means positioned and arranged with respect to and operatively connected with said race members and said antifriction members for holding the antifriction members, including those members away from which said spindle tends to shift under said load, under pressure upon and in constant contact with said raceways during all times of application of said load, whereby said spindle is antifrictionally mounted and also at all times positively held from shifting under said load; substantially as described.

2. In a lathe and the like, a spindle adapted to receive a radial load, antifriction means supporting said spindle and comprising inner and outer race members and antifriction members therebetween, each race member having its raceway extending in a line generally oblique to the line of said spindle and matching raceways being generally parallel, and means for forcing certain of said race members toward a matching race member to at all times hold all of said antifriction members under pressure between said races; substantially as described.

3. In a lathe and the like, a spindle adapted to receive a radial load, a plurality of antifriction bearings supporting said spindle and surrounding the same, two of said bearings comprising each an inner and an outer race member with antifriction members therebetween, the inner members being fixed against sliding along the spindle and having each an oblique raceway extending away from the line of said spindle and away from the other inner member, each outer race member having an oblique raceway extending generally parallel to that of its matching inner race member and one of said outer race members being fixed against sliding along the line of the spindle and the other race member being slidable along said line, means forcing said slidable race member toward its coöperating antifriction members and away from the fixed outer race member for at all times holding all of said antifriction members in intimate contact with respective raceways; substantially as described.

4. In a device of the character indicated, an antifriction bearing comprising an inner and an outer race member with antifriction members therebetween, and a support for the outer race member, there being means between said support and said outer race member for causing the antifriction members to bear equally upon said race members; substantially as described.

5. In a device of the character indicated, an antifriction bearing comprising an inner and an outer race member and antifriction members therebetween, and a support for the outer race member and providing a seat therefor, said outer race member and said seat being formed to insure the equal bearing of said antifriction members upon said race members; substantially as described.

6. In a device of the character indicated, an antifriction bearing comprising an inner and an outer race member with antifriction members therebetween, a support for the outer race member and providing a seat therefor, said seat and the coöperating rim of said outer race member being correspondingly curved crosswise of said bearing upon a spherical surface having its center upon the longitudinal axis of said bearing and at the intersection of said axis and the line at right angles thereto and passing through the centers of opposite antifriction members; substantially as described.

7. In a device of the character indicated, a shaft adapted to receive a radial load, an antifriction bearing therefor and surrounding the same and comprising an inner and an outer race member and antifriction members therebetween, and a support for said outer race member, there being means between said support and said outer race member for causing the antifriction members to bear equally upon said race members under said load; substantially as described.

8. In a device of the character indicated, a shaft adapted to receive a radial load, an antifriction bearing therefor and surrounding the same and comprising an inner and an outer race member and antifriction members therebetween, a support for said outer race member, and means for applying a thrust load to said shaft, there being means between said support and said outer race member for causing said antifriction members to bear equally upon said members under said loads; substantially as described.

9. In a device of the character indicated, a shaft, an antifriction bearing therefor comprising an inner and an outer race member and antifriction members therebetween, a support for said outer race member, there being means between said support and said outer race member for permitting said antifriction members to bear equally upon the raceways of said race members when the parts are in normal position, and means for maintaining said parts in normal position; substantially as described.

10. In a device of the character indicated, a shaft adapted to receive a radial load, an antifriction bearing therefor comprising an inner and an outer race member and antifriction members therebetween, a support for said outer race member, there being means between said support and said outer race member for permitting said antifriction members to bear equally upon the raceways of said race members when the parts are in normal position, and means for preventing shifting of said shaft under said load and for maintaining said parts in normal position; substantially as described.

In testimony whereof, I hereunto affix my signature, in the presence of two witnesses.

ALBERT F. ROCKWELL.

Witnesses:
VERNER A. GREENE,
M. B. THORPE.

It is hereby certified that in Letters Patent No. 1,142,730, granted June 8, 1915, upon the application of Albert F. Rockwell, of Bristol, Connecticut, for an improvement in "Machine-Tools," an error appears in the printed specification requiring correction as follows: Page 2, line 26, for the word "have" read *having;* and that the said Letters Patent should be read with this correction therein that the same may conform to the record of the case in the Patent Office.

Signed and sealed this 29th day of June, A. D., 1915.

[SEAL.] J. T. NEWTON,

*Acting Commissioner of Patents.*